(12) United States Patent
Glassner et al.

(10) Patent No.: US 6,449,016 B1
(45) Date of Patent: Sep. 10, 2002

(54) SEPARATION STAGE FOR SEPARATING A SIGNAL WHICH IS TRANSMITTED IN THE BLANKING INTERVALS OF A VIDEO SIGNAL AND A DISTORTION-COMPENSATION METHOD FOR SUCH A SIGNAL

(75) Inventors: Christian Glassner, Berching; Ulrich Englert; Hartmut Beintken, both of München, all of (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/531,204

(22) Filed: Mar. 20, 2000

Related U.S. Application Data

(63) Continuation of application No. PCT/DE98/02733, filed on Sep. 15, 1998.

(30) Foreign Application Priority Data

Sep. 19, 1997 (DE) ........................................ 197 41 434

(51) Int. Cl.$^7$ ............................................... H04N 11/00
(52) U.S. Cl. ...................................... 348/465; 348/468
(58) Field of Search ................................ 348/470, 468, 348/465, 476, 607, 193, 180

(56) References Cited

U.S. PATENT DOCUMENTS

| | | | | |
|---|---|---|---|---|
| 4,358,790 A | * | 11/1982 | Summers | .................... 358/147 |
| 4,625,241 A | | 11/1986 | Ohzeki | |
| 4,656,513 A | * | 4/1987 | Langenkamp | ................ 358/147 |
| 4,841,357 A | | 6/1989 | Gillies | |
| 5,404,172 A | * | 4/1995 | Bermah et al. | .............. 348/465 |
| 5,486,865 A | * | 1/1996 | James | ......................... 348/465 |
| 5,561,469 A | * | 10/1996 | Schultz | ....................... 348/476 |
| 5,666,167 A | * | 9/1997 | Tults | ........................... 348/465 |
| 5,715,011 A | * | 2/1998 | Bramwell | .................... 348/462 |

FOREIGN PATENT DOCUMENTS

| | | |
|---|---|---|
| DE | 43 07 687 A1 | 9/1984 |
| DE | 33 30 979 C2 | 3/1985 |
| EP | 0 056 649 | 7/1982 |
| EP | 0 099 543 A1 | 2/1984 |
| EP | 0 137 830 B1 | 4/1985 |

OTHER PUBLICATIONS

Patent Abstracts of Japan No. 59–07779 (Kazuyoshi), dated May 4, 1984.

* cited by examiner

*Primary Examiner*—Victor R. Kostak
(74) *Attorney, Agent, or Firm*—Laurence A. Greenberg; Werner H. Stemer; Ralph E. Locher

(57) ABSTRACT

A distortion-compensation method for a signal (S) that is transmitted in the blanking intervals of a video signal (CVBS) uses the received signal (S) to determine whether the signal (S) is subject to interference of a specific type. This interference is at least partially compensated for only when a specific limit value is exceeded. A separation stage according to the invention has a measurement apparatus (M) for detecting the presence of the specific type of interference.

4 Claims, 4 Drawing Sheets

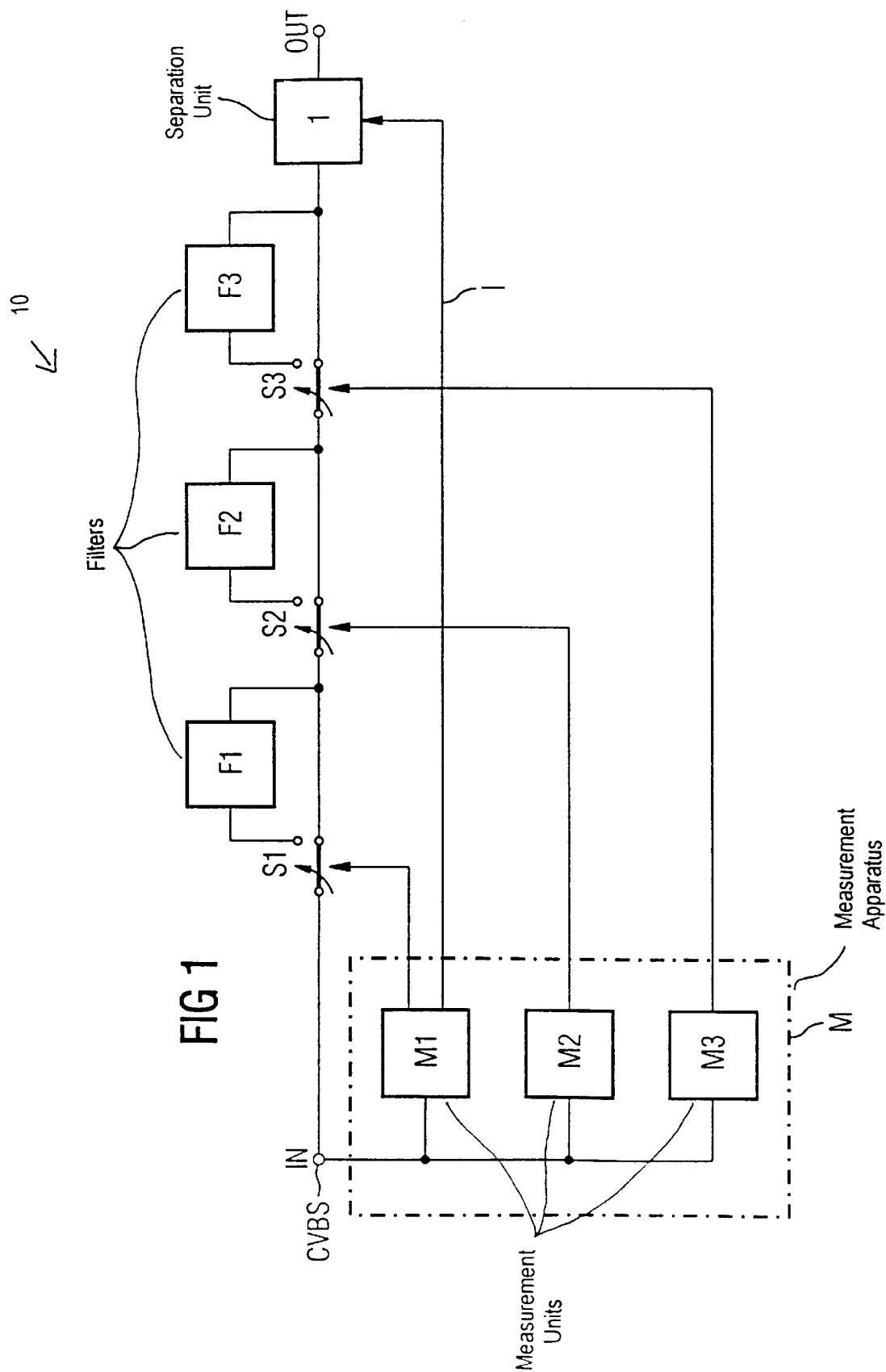

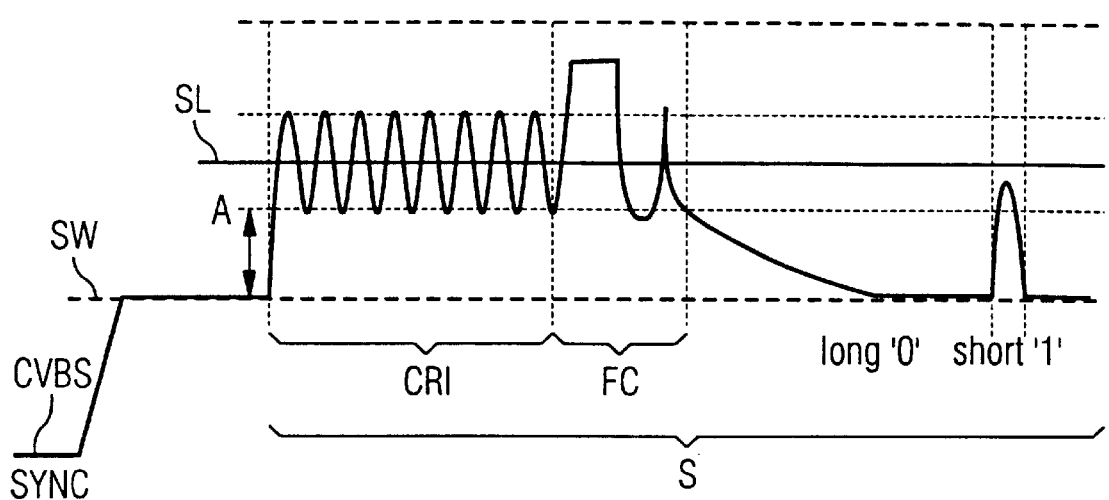
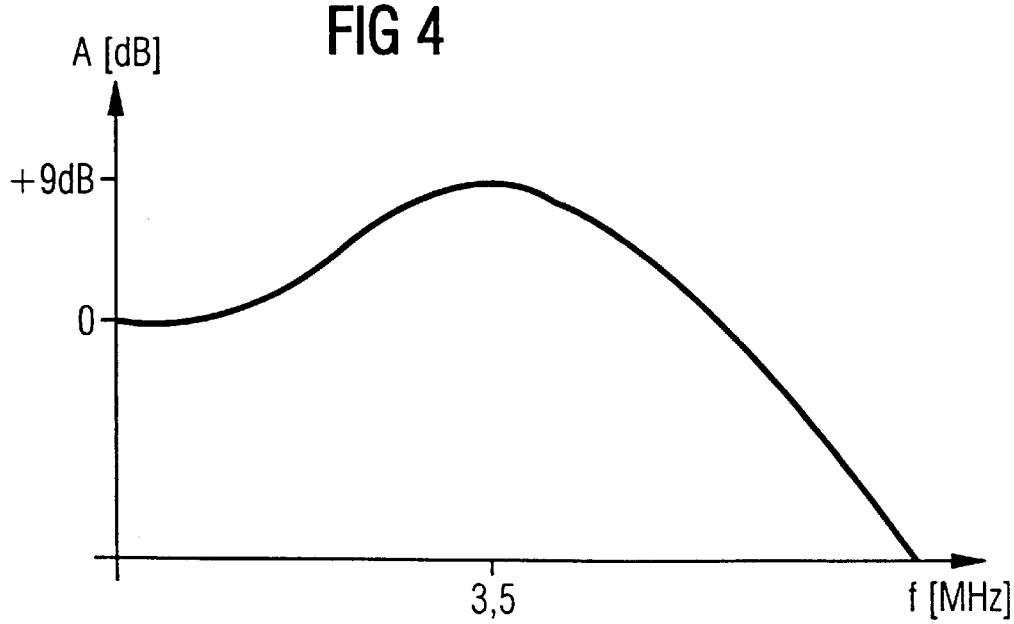

SEPARATION STAGE FOR SEPARATING A SIGNAL WHICH IS TRANSMITTED IN THE BLANKING INTERVALS OF A VIDEO SIGNAL AND A DISTORTION-COMPENSATION METHOD FOR SUCH A SIGNAL

CROSS-REFERENCE TO RELATED APPLICATION

This is a continuation of copending International Application PCT/DE98/02733, filed Sep. 15, 1998, which designated the United States.

BACKGROUND OF THE INVENTION

Field of the Invention

The invention relates to a separation stage for separating a signal that is transmitted in the blanking intervals of a video signal, and to a distortion-compensation method provided for such a signal.

Teletext is a signal known in Europe that complies with the World Standard Text Format and that is transmitted in the blanking intervals of a video signal. Once all of the picture lines of a field have been transmitted in a video signal, they are followed by a vertical synchronization pulse, which resets the tube scanning beam. The vertical synchronization pulse is followed by a blanking interval in which no picture information is transmitted. This reset pause or blanking interval is used to transmit a Teletext signal, or other data services. Each Teletext line is introduced by a horizontal synchronization pulse for the electron beam of a tube in the television set.

The Teletext signal is recovered from the video signal in the television set by means of a separation stage, the so-called slicer. The first step of this process is data separation in which the received signal is broken down into binary data. This is followed by clock recovery with the receiver being synchronized to the received Teletext signal.

The transmitted Teletext signal may be subject to interference from, inter alia, noise, group delay distortion, or attenuation distortion.

SUMMARY OF THE INVENTION

It is accordingly an object of the invention to provide a separation stage for separating a signal that is transmitted in the blanking intervals of a video signal and a distortion-compensation method involving such a signal in which the signal is compensated for distortion which overcomes the hereinafore-mentioned disadvantages of the heretofore-known methods and devices of this general type.

With the foregoing and other objects in view there is provided, in accordance with the invention, a distortion-compensating method for correcting a signal that is transmitted during the blanking intervals of a video signal. A signal is received that has a relatively high-frequency section and that has been transmitted during the blanking intervals of a video signal. It is determined whether interference in the form of frequency-dependent attenuation is present in the received signal and a difference is obtained by comparing minima of the relatively high-frequency section of the received signal with a black level of the video signal. The interference is at least partially compensated for, only if the difference exceeds a limit value.

In the distortion-compensation method, the received signal is used to determine whether interference of a specific type is present. At least partial compensation for this interference is carried out only if it exceeds a specific limit value so that insignificant interference is ignored. Distortion compensation is thus carried out only when interference is also actually present. Furthermore, the compensation is dependent on the type of interference so that each type of interference can be compensated for optimally.

The invention is advantageous since, in practice, the type and level of interference continuously varies in the signal in which distortion-compensation is to be carried out. Severe frequency-dependent attenuation, for example, can be compensated for by a peaking filter. However, if there is no interference in the supplied Teletext signal, a peaking filter would considerably reduce the signal level.

In accordance with an added feature of the invention, there is provided an embodiment that compensates for group delay distortion. This embodiment provides for a signal, called a sample signal, to be derived from a relatively high-frequency section of the signal, and to be used to sample a relatively low-frequency section of the signal. Interference is detected by determining whether signal flanks within the low-frequency section are in a predetermined or expected position relative to the sample pulses of the sample signal.

In this way, it is possible to detect whether signal flanks of the low-frequency section are related as expected in time to the sample pulses of the sample signal. To do this, it is, of course, necessary to know the relationship with respect to time when the signal is not subject to interference.

If it is found that the signal flanks of the low-frequency section are not related as expected in time to the sample pulses of the sample signal, and if this discrepancy is greater than a limit value that can be predetermined, compensation is carried out for the group delay distortion.

In accordance with an additional feature of the invention, there is provided an all-pass filter to compensate for the group delay distortion.

In accordance with another feature of the invention, the described compensation for correcting group delay distortion is applied to a Teletext signal. The high-frequency section in this case contains synchronization pulses of the Teletext signal and its low-frequency section is part of a frame code of the Teletext signal. Both the synchronization pulses (clock run in) and its frame code are standardized for a Teletext signal. This is advantageously suitable for the described process of determining whether or not group delay distortion is present.

In accordance with a further feature of the invention, there is provided an embodiment that, instead of using an all-pass filter, uses mutual phase-shifting to compensate for the frequency-dependent attenuation. The compensation is carried out by adapting the frequency of the sample signal in such a manner that the signal flanks of the low-frequency section are then in the predetermined position relative to the sample pulses of the adapted sample signal. This is achieved by mutual phase-shifting.

In accordance with a further added feature of the invention, there is provided an embodiment to compensate for frequency-dependent attenuation. With interference of this type, high-frequency signal elements are more severely attenuated than low-frequency signal elements during signal transmission. In order to detect frequency-dependent attenuation, a peak value of a relatively high-frequency section of the signal is thus compared with a reference value. If the difference between the peak value and the reference value exceeds a limit value, then it is evident that the high-frequency section has been more severely attenuated. If the presence of frequency-dependent attenuation is detected in this way, compensation is carried out for the interference, for example, by using a peaking filter which amplifies high-frequency sections of the signal more than low-frequency sections.

In accordance with a further additional feature of the invention, the reference value, with which the peak value of the high-frequency section is compared to, is a black level of the video signal.

In accordance with yet an added feature of the invention, there is provided an embodiment where the signal is once again a Teletext signal and the high-frequency section with which the frequency-dependent attenuation is detected contains synchronization pulses of the Teletext signal. As already mentioned, the synchronization pulses of a Teletext signal (clock run in) are a standardized signal section. This is a sequence of alternating zeros and ones, so that the synchronization pulses always form the section of the Teletext signal whose frequency is the highest. The synchronization pulses of the Teletext signal are thus particularly suitable both for detecting frequency-dependent attenuation and for generating the high-frequency sample signal to detect the group delay distortion according to the embodiment of the invention described hereinabove.

With the foregoing and other objects in view there is provided, in accordance with the invention, a separation stage for separating a signal that is transmitted during the blanking intervals of a video signal. The separation stage includes an input for receiving a signal that has a relatively high-frequency section with minima and that is transmitted during the blanking intervals of a video signal. A filter is provided that can be activated to compensate for frequency-dependent attenuation of the signal. A measurement apparatus is provided for detecting frequency-dependent attenuation of the signal. The measurement apparatus is connected to the input. The measurement apparatus has an output for only activating the filter when the measurement apparatus detects that a difference between the minima of the relatively high-frequency section of the signal and a black level of the video signal exceeds a limit value.

The measurement apparatus uses the received signal to determine whether the signal is subject to interference of a specific type.

Other features which are considered as characteristic for the invention are set forth in the appended claims.

Although the invention is illustrated and described herein as embodied in a separation stage for separating a signal that is transmitted in the blanking intervals of a video signal, and a distortion-compensation method involving such a signal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 shows an exemplary embodiment of a separation stage according to the invention;

FIG. 2 shows a Teletext signal subject to distortion as a result of frequency-dependent attenuation;

FIG. 4 shows the frequency response of a peaking filter;

FIG. 5B shows the Teletext signal from FIG. 5A, in which the distortion has been compensated for.

DESCRIPTION OF THE PREFERRED EMBODIMENTS

Figure 3A:
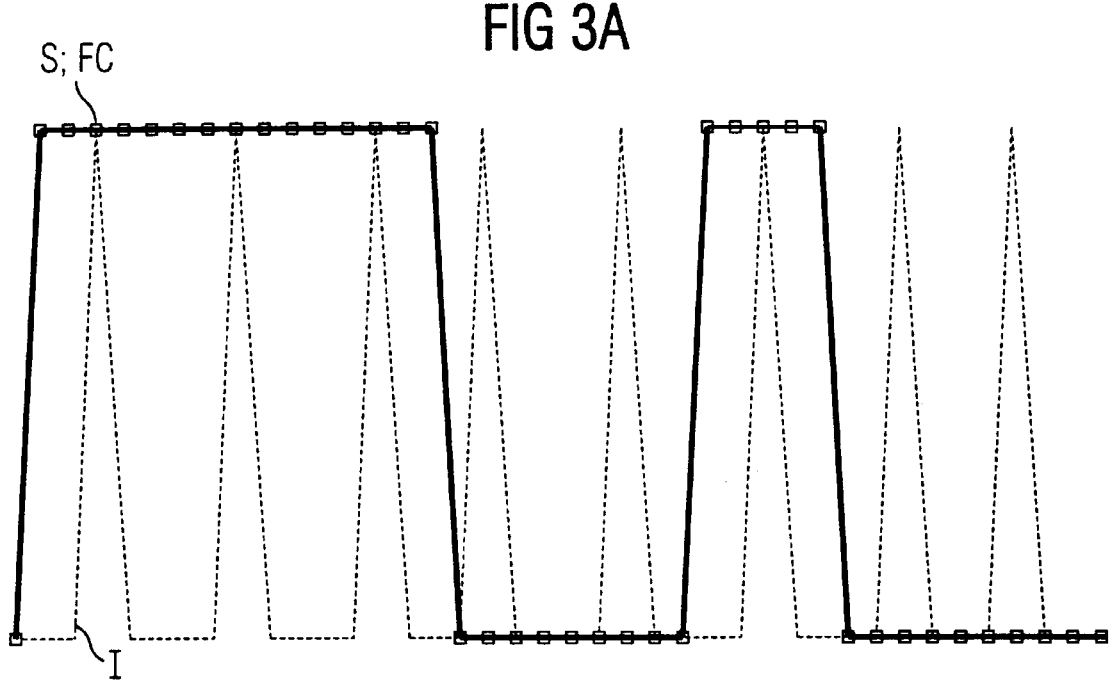
FIG. 3A shows an undistorted frame code of a Teletext signal.

Referring now to the figures of the drawing in detail and first, particularly, to FIG. 1 thereof, an exemplary embodiment of an inventive separation stage 10 can be seen. An input IN of this stage 10 can be supplied with a video signal CVBS (Color Video Broadcasting Signal), which has blanking intervals in which a Teletext signal is transmitted. The separation stage 10 has a measurement apparatus M, which contains various measurement units M1 to M3, which are used to detect different types of interference in the Teletext signal. The separation stage 10 furthermore has an appropriate filter F1 to F3 for each of the measurement units M1 to M3. Each filter F1 to F3 is used to compensate for the respective type of interference and is activated only when the associated measurement unit M1 to M3 detects the presence of the corresponding type of interference in the received Teletext signal. FIG. 1 shows the switches S1 to S3 in a position such that the filters F1 to F3 are bridged. That is to say they are deactivated when the associated measurement unit M1 to M3 does not detect the respective type of interference. If, on the other hand, one of the measurement units M1 to M3 detects that the type of interference it is intended to monitor is present in the received Teletext signal, it uses the appropriate switch S1 to S3 to activate the associated filter F1 to F3 so that the associated filter F1 to F3 is now connected in the signal path of the Teletext signal between the input IN and an output OUT of the separation stage 10.

In this exemplary embodiment, the first measurement unit M1 is used to measure any positive or negative group delay distortion of the Teletext signal. The second measurement unit M2 is used to measure any frequency-dependent attenuation, and the third measurement unit M3 is used to measure noise. The first filter F1 is an all-pass filter, the second filter F2 is a peaking filter, and the third filter F3 is a filter to compensate for noise. The components shown in FIG. 1 are preferably in the form of hardware, but may also be in the form of software.

The filters F1 to F3 are followed by a separation unit 1 which, like conventional separation stages, is used for data separation and subsequent clock recovery from the Teletext signal.

FIG. 2 shows the initial sequence of a Teletext signal S. One line of the Teletext signal S is transmitted after each horizontal synchronization pulse SYNC for an electron beam in a television set, and occurs in a blanking interval of the video signal CVBS. The electron beam is blanked out during the blanking interval. The teletext signal S starts with the standardized synchronization pulses CRI (Clock Run In).

The synchronization pulses CRI are used for bit synchronization of the separation stage 10 to the Teletext signal. In order to distinguish whether a logic "1" or a logic "0" is present, the separation unit 1 in FIG. 1 uses the synchronization pulses CRI to determine a slicing level SL by forming an arithmatic mean value. This is followed by recovery of the bit clock, by supplying the synchronization pulses CRI to a phase locked loop. The signal, called a sample signal, produced in this way is used to sample the received Teletext signal. Samples which are above the slicing level SL are identified as logic "1", and samples which are below the slicing level SL are identified as logic "0".

The synchronization pulses CRI in the Teletext signal S shown in FIG. 2 are followed by a likewise standardized frame code FC (or framing code). While the synchronization pulses CRI have the bit sequence 1010 1010 1010 1010, the format of the frame code FC is 1110 0100. This is used for byte synchronization of the Teletext signal S. A Teletext signal S is transmitted using the non-return-to-zero format (NRZ format). This means that the Teletext signal S has a signal flank only when a change from a logic "0" to a logic "1" takes place, or vice versa.

The frame code FC is followed by the actual wanted information in the Teletext signal S. FIG. 2 shows an example of one possible type of interference with the Teletext signal S. This is frequency-dependent attenuation. It can clearly be seen that the high-frequency section of the synchronization pulses CRI is more severely attenuated than the low-frequency sections of the frame code FC, with three successive ones and two successive zeros. In FIG. 2, the frame code FC is followed by a relatively long sequence of logic zeros, so that the level of the Teletext signal S approaches a black level SW of the video signal CVBS. If this is followed by a single logic "1" followed by further zeros as shown, the frequency-dependent attenuation leads to an undesirable situation. The slicing level SL is not exceeded and the logic "1" is therefore not identified as such.

Figure 5A:
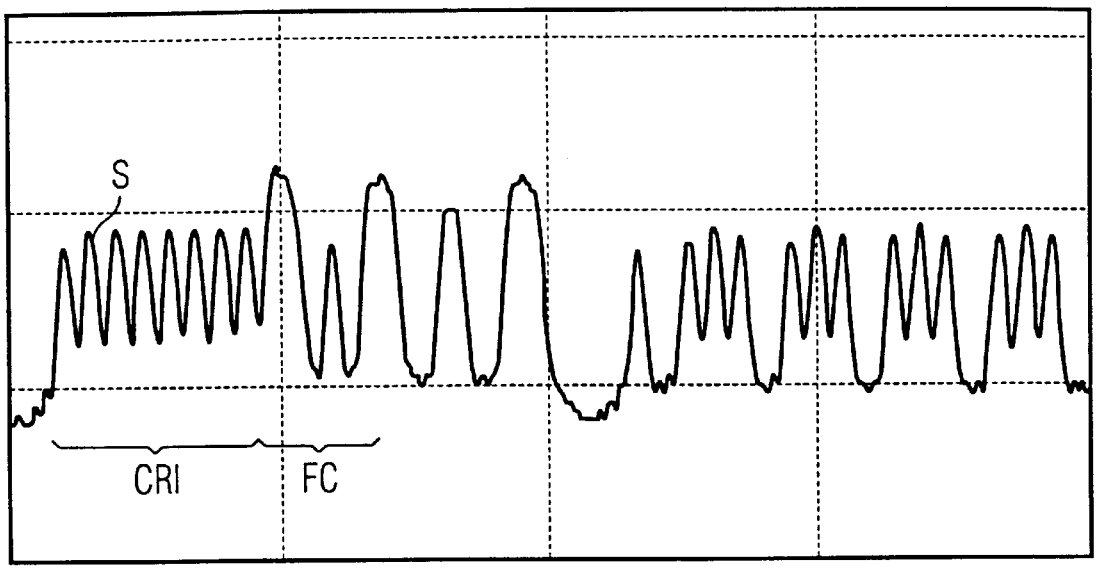
FIG. 5A shows a Teletext signal subject to interference by frequency-dependent attenuation.

FIG. 5A likewise shows a Teletext signal S subject to distortion due to frequency-dependent attenuation. This signal once again starts with synchronization pulses CRI and a frame code FC. In order to determine whether any frequency-dependent attenuation is present, the second measurement unit M2 shown in FIG. 1 determines the magnitude of the difference between the minima A of the synchronization pulses CRI and the black level SW of the video signal CVBS (see FIG. 2). If the signal is subject to attenuation that is not frequency dependent, or is unattenuated, the minima A of the synchronization pulses CRI are in the region of the black level SW. If, on the other hand, the high frequencies are severely attenuated, these minima A are significantly above the black level SW. If this difference exceeds a predetermined level, this confirms that the high-frequency synchronization pulses CRI have been excessively severely attenuated, and the second measurement unit M2 activates the second filter F2 via the second switch S2. The second filter F2 is a peaking filter with a frequency response illustrated in FIG. 4. The peaking filter amplifies only the high frequencies and leaves the lower-frequency signal elements unchanged. The synchronization pulses CRI are at a frequency of 3.5 MHz.

Figure 5B:
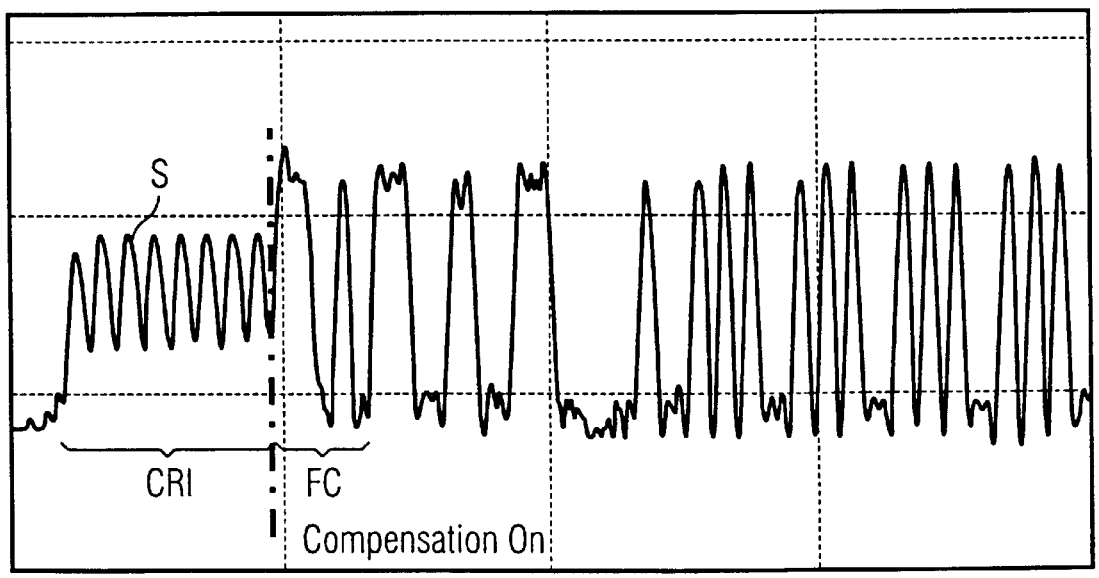

FIG. 5B shows the Teletext signal S from FIG. 5A after the second filter F2 has been activated by the second measurement unit M2. During reception of the synchronization pulses CRI, the second measurement unit M2 carries out the described interference measurement and the second filter F2 has not yet been activated. If the second measurement unit M2 identifies the presence of frequency-dependent attenuation, it activates the second filter F2 before the start of the frame code FC. FIG. 5B clearly shows that the high-frequency elements of the Teletext signal S are amplified during the compensation process.

Figure 3B:
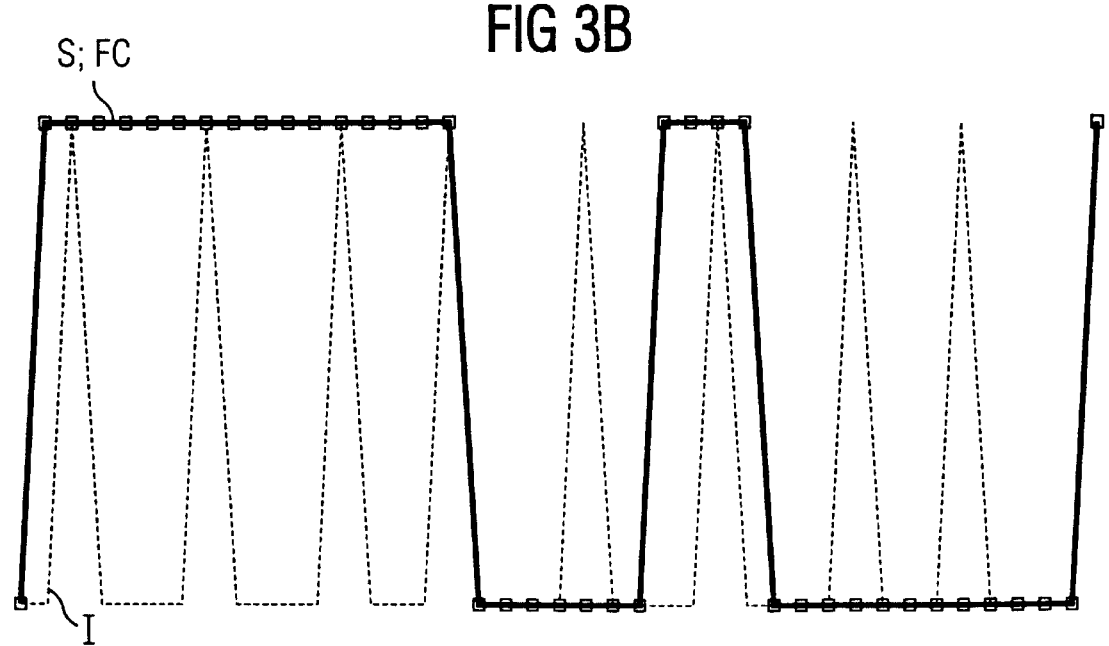
FIG. 3B shows a frame code that is subject to interference from group delay distortion.

The following text uses FIGS. 3A and 3B to explain the operation of the first measurement unit M1 shown in FIG. 1 that is used to detect group delay distortion. In the case of positive group delay distortion, low-frequency signals are delayed less than high-frequency signals. In the case of negative group delay distortion, low-frequency signals are delayed more than high-frequency signals. In the invention, the first measurement unit M1 uses a PLL circuit to derive a sample signal I from the synchronization pulses CRI. It then uses the sample signal I to sample the frame code FC, whose frequency is relatively low in comparison with the high-frequency synchronization pulses CRI. FIG. 3A shows the frame code FC of the Teletext signal S by a solid line. This is sampled by pulses of the sample signal I, which are shown by a dashed line.

It can be seen from FIG. 3A that the sampling of the frame code FC actually produces the standardized bit sequence 1110 0100. This means that the signal flanks of the frame code FC are arranged in the expected manner relative to the sample pulses of the sample signal I.

FIG. 3B shows a situation in which negative group delay distortion is present. Specifically, the low-frequency frame code FC is delayed more than the sample signal I derived from the synchronization pulses CRI. The illustrated situation thus results in an incorrect sample result of 1111 0100. Since the correct sample result, shown in FIG. 3A, is known and is stored in the first measurement unit M1, the first measurement unit M1 recognizes that the signal flanks of the frame code FC in FIG. 3B are not in the expected relative position with respect to the sample pulses of the sample signal I. The presence of negative group delay distortion is thereby identified and the first measurement unit M1 activates the first filter F1 via the first switch S1. The first filter F1 is an all-pass filter, which results in the group delay distortion being at least partially compensated for by delaying the high-frequency sections of the Teletext signal S with respect to its low-frequency sections.

Instead of using the first filter Fl, the first measurement unit M1 can compensate for the group delay distortion. After detecting this type of interference, the first measurement unit M1 can influence the phase of the sample signal I in such a way that the signal flanks of the frame code FC are in the predetermined or expected position relative to the sample pulses of the adapted sample signal. In the group delay distortion situation shown in FIG. 3B, the first measurement unit M1 then changes the phase of the sample signal I to restore the situation shown in FIG. 3A. In other words, the sample signal I derived from the synchronization pulses CRI is synchronized to the frame code FC. The sample signal I is then used to sample the wanted signals that follow the frame code in the Teletext signal. For this purpose, the Teletext signal is supplied to the separation unit 1 in FIG. 1.

The invention has the advantage that distortion-compensation filters (F1–F3) are activated only when they are actually required, that is to say when the corresponding type of interference is present. If none of the measurement units M1–M3 detect any interference, the Teletext signal S is supplied to the separation unit 1 without being filtered. There is then no adverse effect whatsoever on the Teletext signal from unrequired filters. If only one of the types of interference is present (frequency-dependent attenuation, group delay distortion or noise), the only filter F1 to F3 which is activated is that which is designed to only compensate for this type of interference.

In other exemplary embodiments of the invention, finer distortion compensation than that shown in FIG. 1 is also possible. For this purpose, the measurement units M1 to M3 may distinguish between different levels of interference, and accordingly activate filters that are suitable to compensate for interference at the corresponding interference level.

In other embodiments of the invention, it is possible not to be limit the interference measurement to the synchronization pulses CRI and the frame code FC of a single Teletext line, but rather the measurement results can be averaged for different Teletext lines.

The filters F1 to F3 shown in FIG. 1 may be either analog or digital filters.

The invention can also be applied to other TV data services, for example to NTSC Teletext (NABTS).

Other features which are considered as characteristic for the invention are set forth in the appended claims.

Although the invention is illustrated and described herein as embodied in a separation stage for separating a signal that is transmitted in the blanking intervals of a video signal, and a distortion-compensation method provided for such a signal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

We claim:

1. A distortion-compensating method for correcting a signal that is transmitted during the blanking intervals of a video signal, which comprises:

receiving a signal, that includes a signal portion having a higher frequency than another signal portion, and that has been transmitted during the blanking intervals of a video signal;

determining whether interference in the form of frequency-dependent attenuation is present in the received signal and obtaining a difference by comparing minima of the signal portion having the higher frequency with a black level of the video signal; and only if the difference exceeds a limit value, at least partially compensating for the interference.

2. The method according to claim 1, which comprises using a peaking filter to perform the step of at least partially compensating for the interference.

3. The method according to claim 1, wherein the received signal includes a Teletext signal and the high-frequency section of the received signal includes synchronization pulses.

4. A separation stage for separating a signal that is transmitted during the blanking intervals of a video signal, comprising:

an input for receiving a signal including a high-frequency signal portion having a higher frequency than another signal portion, said high-frequency signal portion having minima, said signal being transmitted during the blanking intervals of a video signal;

filter that can be activated to compensate for frequency-dependent attenuation of the signal; and a measurement apparatus for detecting frequency-dependent attenuation of the signal, said measurement apparatus connected to said input, and said measurement apparatus having an output for only activating said filter when said measurement apparatus detects that a difference between the minima of the relatively high-frequency section of the signal and a black level of the video signal exceeds a limit value.

* * * * *